March 1, 1932.  A. MANZO  1,848,017
AUTOMOBILE ENGINE PROTECTOR
Filed Sept. 20, 1929
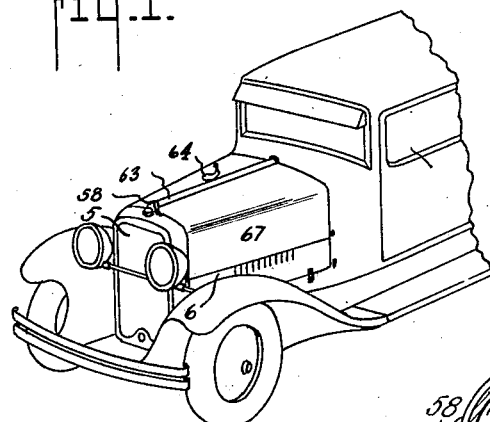
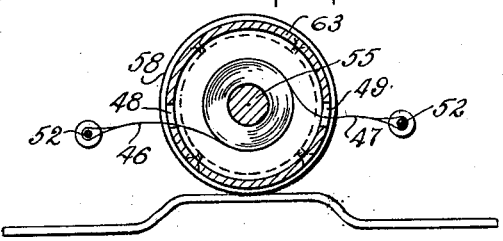
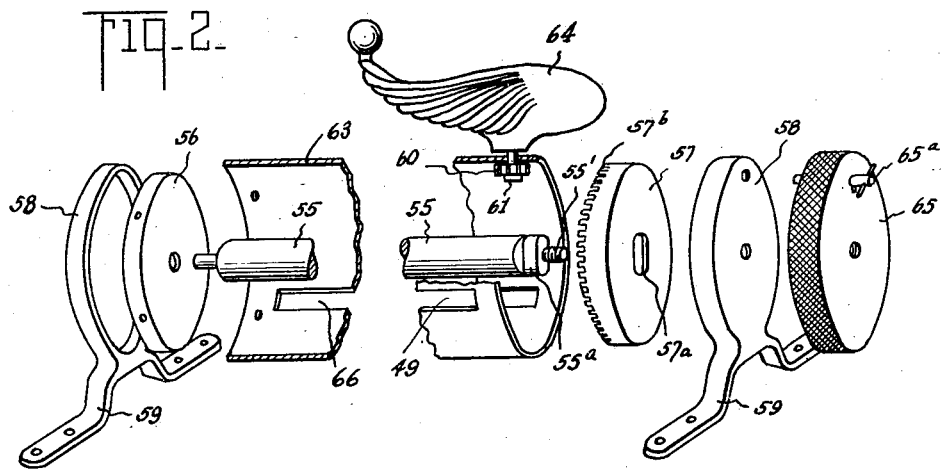
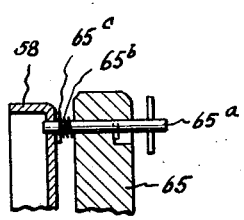
ANTHONY MANZO
INVENTOR
BY *Victor J. Evans*
ATTORNEY
WITNESS:

Patented Mar. 1, 1932

1,848,017

UNITED STATES PATENT OFFICE

ANTHONY MANZO, OF BROOKLYN, NEW YORK, ASSIGNOR, BY DIRECT AND MESNE ASSIGNMENTS, TO AMERICAN NEW FASHION SILVERWARE CORPORATION, OF BROOKLYN, NEW YORK, A CORPORATION OF NEW YORK

AUTOMOBILE ENGINE PROTECTOR

Application filed September 20, 1929. Serial No. 394,114.

This invention relates to improvements in covers for automobiles, and its leading object is to provide a rollable auxiliary cover for the engine and power plant hood of an automobile, so that the driver of the vehicle may quickly cover the hood during rain or snow, and thus prevent leakage of water into the engine or power plant, with resulting short circuiting of the electrical wiring, dilution of the gasoline and oil supply, and injury of the lubricated joints through rust and washing out of the lubrication.

One of the objects of the invention is the provision of an enclosing case which may be mounted upon the central top portion of an engine plant hood, and from which rollable covers may be drawn to cover the hood.

Other objects and advantages of the invention will be hereinafter specifically pointed out, or will become apparent, as the specification proceeds.

With the above indicated objects in view, the invention resides in certain novel constructions and combinations and arrangements of parts, clearly described in the following specification, and fully illustrated in the accompanying drawings, which latter show an embodiment of the invention as at present preferred. In the drawings:—

Fig. 1 is a perspective view of an automobile equipped with the improved auxiliary hood cover, showing the cover partly extended over the hood.

Fig. 2 is a view in perspective of the invention, showing the parts thereof separated.

Fig. 3 is a detail view of a retaining latch.

Figure 4 is a transverse sectional view of the invention.

Referring to the drawings in detail 5 designates the front end of an automobile, which is equipped with the usual hinged hood, comprising oppositely opening wings 6, which are hinged upon a central longitudinal support at the top of the hood, the details of which are not essential to this invention.

Above this central longitudinal hinge line of the companion hood wings 6 the enclosing case 63 is supported by end caps 58 the feet 59 of which are secured to the automobile body.

As shown in Figure 2 a roller 55 is supported at one end on the bracket plate 56 and at the end opposite thereto by the bracket plate 57, which is provided with a rectangular hole 57a to receive a correspondingly shaped end 55a of the roller 55. The bracket plates are supported in end caps 58, secured by their feet 59 to the automobile body.

The bracket plate 57 is provided with a series of gear teeth 57b which are engageable by the pinion gear 60, which is mounted on the small shaft 61 arranged to turn in the bearing 62 of the case 63. To the head of this shaft the ornamental figure 64 is mounted. The shaft or reduced end of the roller 55 is threaded at 55′ and on this threaded end the cap 65 is threaded. The case 63 is secure at its ends to the end caps 58 and is provided in its opposite sides with longitudinal slots 48 and 49 through which the flexible curtains 46 and 47, wound upon the roller 55, pass. Both curtains are terminally provided with terminal bars 52 and are wound on the roller 55 in the same direction, so that both are reeled or unreeled simultaneously with the turning of the roller in the proper direction. By turning the ornamental figure the roller will be rotated, through the engaging gears 57 and 60, or by turning the auxiliary end cap 65 the roller may be turned in a winding direction. Before the roller may be turned the cap 65 must be disconnected from the bracket 58 by pulling outwardly on a locking pin 65a against the action of a spring 65b encircling the mentioned pin until the inner end of the pin is disengaged from the bracket 58. Said spring is coiled around the pin and abuts against the inner face of the cap 65 and against a cross pin 65 which passes through and is held to the mentioned pin.

I claim as new:—

1. The combination with an automobile having an engine plant and a hood over said engine plant, a casing mounted on said hood, a pair of flexible curtains mounted within said casing, a roller to support said curtains, and means to operate said curtain roller, said means including opposite bracket plates in which said roller is mounted, one of said bracket plates having gear teeth, a pinion mounted within said casing in intermeshing engagement with said gear teeth, and externally manipulable means mounted on said casing for operating said pinion to effect rotation of said toothed bracket plate and hence said curtain roller.

2. The combination with an automobile having an engine plant and a hood over said engine plant, a casing mounted on said hood, a pair of flexible curtains rollably mounted within said casing, supporting means in said casing for said curtains, means to retain said curtains in place when extended over said hood, and means to operate said curtain supporting means, said means including bracket plates secured to said curtain supporting means, one of said bracket plates having gear teeth, a pinion mounted within said casing in intermeshing engagement with said gear teeth, externally manipulable means mounted on said casing to operate said pinion to effect rotation of said toothed bracket plate and hence said curtain roller, and additional means for rotating said toothed bracket plate.

3. The combination with an automobile having an engine plant and a hood including a pair of hood wings hingedly mounted longitudinally over said engine plant, a casing mounted on said hood parallel to the hinge connections of said wings, a pair of flexible curtains rollably mounted within said casing, roller means for supporting said curtains, means at the sides of said hood to retain said curtains in place when extended over said hood wings, and means to operate said roller means, including bracket plates at the opposite ends of said casing, one of said bracket plates having gear teeth, a pinion mounted within said casing in intermeshing engagement with said gear teeth, externally manipulable means mounted on said casing to operate said pinion to effect rotation of said toothed bracket plate and hence said curtain roller, and an end cap operatively connected to said toothed bracket plate for also rotating said toothed bracket plate.

In testimony whereof I hereby affix my signature.

ANTHONY MANZO.